(12) United States Patent
Noguchi et al.

(10) Patent No.: US 12,064,997 B2
(45) Date of Patent: Aug. 20, 2024

(54) MOTORCYCLE TIRE

(71) Applicant: SUMITOMO RUBBER INDUSTRIES, LTD., Hyogo (JP)

(72) Inventors: Yoshihisa Noguchi, Hyogo (JP); Keiji Takagi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 352 days.

(21) Appl. No.: 17/316,889

(22) Filed: May 11, 2021

(65) Prior Publication Data
US 2021/0354516 A1    Nov. 18, 2021

(30) Foreign Application Priority Data
May 14, 2020   (JP) ................................ 2020-085426

(51) Int. Cl.
| | |
|---|---|
| B60C 11/11 | (2006.01) |
| B60C 1/00 | (2006.01) |
| B60C 11/00 | (2006.01) |
| B60C 11/03 | (2006.01) |
| B60C 11/13 | (2006.01) |

(52) U.S. Cl.
CPC ............ B60C 11/11 (2013.01); B60C 1/0016 (2013.01); B60C 11/0008 (2013.01); B60C 11/0327 (2013.01); B60C 11/033 (2013.01); B60C 11/1376 (2013.01); B60C 2011/0025 (2013.01); B60C 2200/10 (2013.01); B60C 2200/14 (2013.01)

(58) Field of Classification Search
CPC ... B60C 1/0016; B60C 11/0008; B60C 11/11; B60C 11/033; B60C 11/0327; B60C 11/1376; B60C 2011/0025; B60C 2200/10; B60C 2200/14
See application file for complete search history.

(56) References Cited

U.S. PATENT DOCUMENTS

| | | | | |
|---|---|---|---|---|
| 5,901,766 | A | * 5/1999 | Sandstrom | C08L 21/00 524/270 |
| 2012/0024440 | A1 | * 2/2012 | Ishida | B60C 11/11 152/209.1 |
| 2012/0024443 | A1 | * 2/2012 | Ishida | B60C 11/13 152/209.18 |

FOREIGN PATENT DOCUMENTS

| | | | | |
|---|---|---|---|---|
| CN | 111086359 A | * 5/2020 | ............. | B60C 11/03 |
| JP | 2007-168651 | 7/2007 | | |
| JP | 2010024400 A | * 2/2010 | ............... | B29B 7/90 |
| JP | 2013071970 A | * 4/2013 | ................ | C08L 9/00 |
| JP | 2014141163 A | * 8/2014 | ......... | B60C 11/1376 |

* cited by examiner

*Primary Examiner* — Justin R Fischer
*Assistant Examiner* — Philip N Schwartz
(74) *Attorney, Agent, or Firm* — Greenblum & Bernstein, P.L.C.

(57) ABSTRACT

A tread of a tire includes a plurality of blocks including a center block located on an equator plane and a side block located outward of the center block in an axial direction. Each of the plurality of blocks includes a land surface that forms a part of a tread surface. In the tread surface, a total area of the land surfaces is smaller than a total area of a portion other than the land surfaces. A complex elastic modulus at a maximum strain amplitude of 1% and a temperature of 70° C. of each block is not less than 10.0 MPa. A 300% modulus at a temperature of 75° C. of each block is not greater than 6.0 MPa.

20 Claims, 6 Drawing Sheets

MOTORCYCLE TIRE

TECHNICAL FIELD

The present invention relates to motorcycle tires. Specifically, the present invention relates to tires for a motorcycle that runs on rough terrain.

BACKGROUND ART

A plurality of blocks are provided in the tread of a tire for a motorcycle that runs on rough terrain. On a soft road, the blocks are pressed into the road surface. Steering stability is ensured by scratching the road surface at the edges of the blocks to obtain traction or cornering force. Such a tire is disclosed, for example, in PATENT LITERATURE 1 below.

CITATION LIST

Patent Literature

PATENT LITERATURE 1: Japanese Laid-Open Patent Publication No. 2007-168651

SUMMARY OF INVENTION

Technical Problem

If the blocks are formed from a rubber having a high modulus, great traction can be obtained. However, since the deformation of the blocks is suppressed, there is a concern that, in the case of sliding the tire, the tire will suddenly start to slide.

If the blocks are formed from a rubber having a low modulus, it is expected that slide control performance can be improved. However, since the blocks are easily deformed, there is a concern that sufficient traction cannot be obtained during normal running.

The present invention has been made in view of the above circumstances, and an object of the present invention is to provide a motorcycle tire that can achieve both traction performance and slide control performance.

Solution to Problem

A motorcycle tire according to an aspect of the present invention includes a tread that comes into contact with a road surface at a tread surface thereof. The tread includes a plurality of blocks including a center block located on an equator plane and a side block located outward of the center block in an axial direction. Each of the plurality of blocks includes a land surface that forms a part of the tread surface. In the tread surface, a total area of the land surfaces is smaller than a total area of a portion other than the land surfaces. A complex elastic modulus at a maximum strain amplitude of 1% and a temperature of 70° C. of each block is not less than 10.0 MPa. A 300% modulus at a temperature of 75° C. of each block is not greater than 6.0 MPa.

Preferably, in the tire, a product of the complex elastic modulus and a ratio of a development width of the center block to a development width of the tread surface is not less than 1.90 MPa and not greater than 3.25 MPa.

Preferably, in the tire, a ratio of a development width of the center block to a development width of the tread surface is not less than 0.19 and not greater than 0.25.

Preferably, in the tire, a product of the 300% modulus and a ratio of a development length of the center block to a development width of the tread surface is not less than 0.20 MPa and not greater than 0.84 MPa.

Preferably, in the tire, a ratio of a development length of the center block to a development width of the tread surface is not less than 0.07 and not greater than 0.14.

Preferably, in the tire, a product of the complex elastic modulus and a ratio of a development width of the side block to a development width of the tread surface is not less than 0.90 MPa and not greater than 1.69 MPa.

Preferably, in the tire, a ratio of a development width of the side block to a development width of the tread surface is not less than 0.07 and not greater than 0.17.

Preferably, in the tire, a product of the 300% modulus and a ratio of a development length of the side block to a development width of the tread surface is not less than 0.20 MPa and not greater than 1.02 MPa.

Preferably, in the tire, a ratio of a development length of the side block to a development width of the tread surface is not less than 0.05 and not greater than 0.34.

Preferably, in the tire, a ground-contact surface region, in an upright attitude, which is obtained by fitting the tire onto a normal rim, adjusting an internal pressure of the tire to 80 kPa, and bringing the tire into contact with a road surface with a camber angle of the tire being set to 0° and with a load of 0.96 kN being applied as a vertical load to the tire in a case where a nominal rim diameter of the tire is not less than 18 inches or with a load of 0.74 kN being applied as a vertical load to the tire in a case where the nominal rim diameter of the tire is less than 18 inches, includes a plurality of the blocks, and an effective area ratio, in the upright attitude, which is represented as a ratio of a total area of the land surfaces of the blocks included in the ground-contact surface region to an area of the ground-contact surface region in the upright attitude, is not less than 0.10 and not greater than 0.20.

Preferably, in the tire, a ground-contact surface region, in a tilted attitude, which is obtained by fitting the tire onto a normal rim, adjusting an internal pressure of the tire to 80 kPa, and bringing the tire into contact with a road surface with a camber angle of the tire being set to 30° and with a load of 0.96 kN being applied as a vertical load to the tire in a case where a nominal rim diameter of the tire is not less than 18 inches or with a load of 0.74 kN being applied as a vertical load to the tire in a case where the nominal rim diameter of the tire is less than 18 inches, includes a plurality of the blocks, and an effective area ratio, in the tilted attitude, which is represented as a ratio of a total area of the land surfaces of the blocks included in the ground-contact surface region to an area of the ground-contact surface region in the tilted attitude, is not less than 0.10 and not greater than 0.20.

Preferably, in the tire, a number of the blocks included in the ground-contact surface region in the tilted attitude is not less than 3 and less than 12.

Preferably, in the tire, in at least a part of the plurality of blocks, a step is provided at at least a part of a corner portion located on a rotation direction toe side or heel side thereof, and, when a height, to the step, of the block in which the step is provided is denoted by h1, and a height from the step to the land surface of the block is denoted by h2, the height h1 is greater than the height h2.

Preferably, in the tire, a product of the complex elastic modulus and a ratio of the height h1 to the height h2 is not less than 10.2 MPa and not greater than 14.1 MPa.

Preferably, in the tire, a ratio of the height h1 to the height h2 is not less than 1.02 and not greater than 1.08.

Preferably, in the tire, the step is provided in the center block.

Advantageous Effects of Invention

According to the present invention, a motorcycle tire that can achieve both traction performance and slide control performance is obtained.

DESCRIPTION OF EMBODIMENTS

The following will describe in detail the present invention based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state. In the present disclosure, unless otherwise specified, the dimensions and angles of components of the tire are measured in the normal state.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, "nominal rim diameter" means the "nominal rim diameter" included in "tyre designation" specified in JIS D4203 "Motorcycle tyres—Designation and dimensions". The "tyre designation" is also referred to as tire size.

In the present disclosure, a crosslinked rubber is a molded product of a rubber composition obtained by pressurizing and heating the rubber composition. The rubber composition is an uncrosslinked rubber obtained by mixing a base rubber and chemicals in a kneader such as a Banbury mixer. The crosslinked rubber is also referred to as vulcanized rubber, and the rubber composition is also referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene-rubber (IIR). Examples of the chemicals include reinforcing agents such as carbon black and silica, plasticizers such as aromatic oil, fillers such as zinc oxide, lubricants such as stearic acid, antioxidants, processing aids, sulfur, and vulcanization accelerators. Selection of a base rubber and chemicals, the amounts of the selected chemicals, etc., are determined as appropriate according to the specifications of elements such as a tread and a sidewall for which the rubber composition is used.

In the present disclosure, the weight-average molecular weight (Mw) of the base rubber is obtained by conversion, based on a polystyrene standard, of a value measured by gel permeation chromatography (GPC) (GPC-8000 series manufactured by Tosoh Corporation, detector: differential refractometer, column: TSKgel SuperMultipore HZ-M manufactured by Tosoh Corporation).

In the present disclosure, the glass transition temperature (Tg) of the base rubber is measured according to the standards of JIS K7121: 1987 under the condition of a temperature rise rate of 10° C./min by using a differential scanning calorimeter (Q200) manufactured by TA Instruments Japan Inc.

In the present disclosure, the cetyltrimethylammonium bromide (CTAB) specific surface area of a carbon black is measured according to JIS K6217-3: 2001.

In the present disclosure, the compressed oil absorption number (COAN) of a carbon black is measured using dibutyl phthalate according to the standards of JIS K6217-4: 2001.

In present disclosure, a complex elastic modulus at a maximum strain amplitude of 1% and a temperature of 70° C. is measured under the following conditions according to the standards of JIS K6394 using a viscoelasticity measuring machine RSA manufactured by TA Instruments.

Initial strain=0.15%
Frequency=10 Hz
Deformation mode=tension

In this measurement, a test piece is sampled from the tire. When a test piece cannot be sampled from the tire, a test piece is sampled from a sheet-shaped crosslinked rubber (hereinafter, also referred to as a rubber sheet) obtained by pressurizing and heating a rubber composition used for forming an element to be measured, at a temperature of 170° C. for 12 minutes.

In the present disclosure, a 300% modulus means the stress at 300% elongation specified in JIS K6251. A 300% modulus at 75° C. is measured according to the standards of JIS K6251. In this measurement as well, a test piece is sampled from the tire. When a test piece cannot be sampled from the tire, a test piece is sampled from the above-described rubber sheet.

Figure 1:
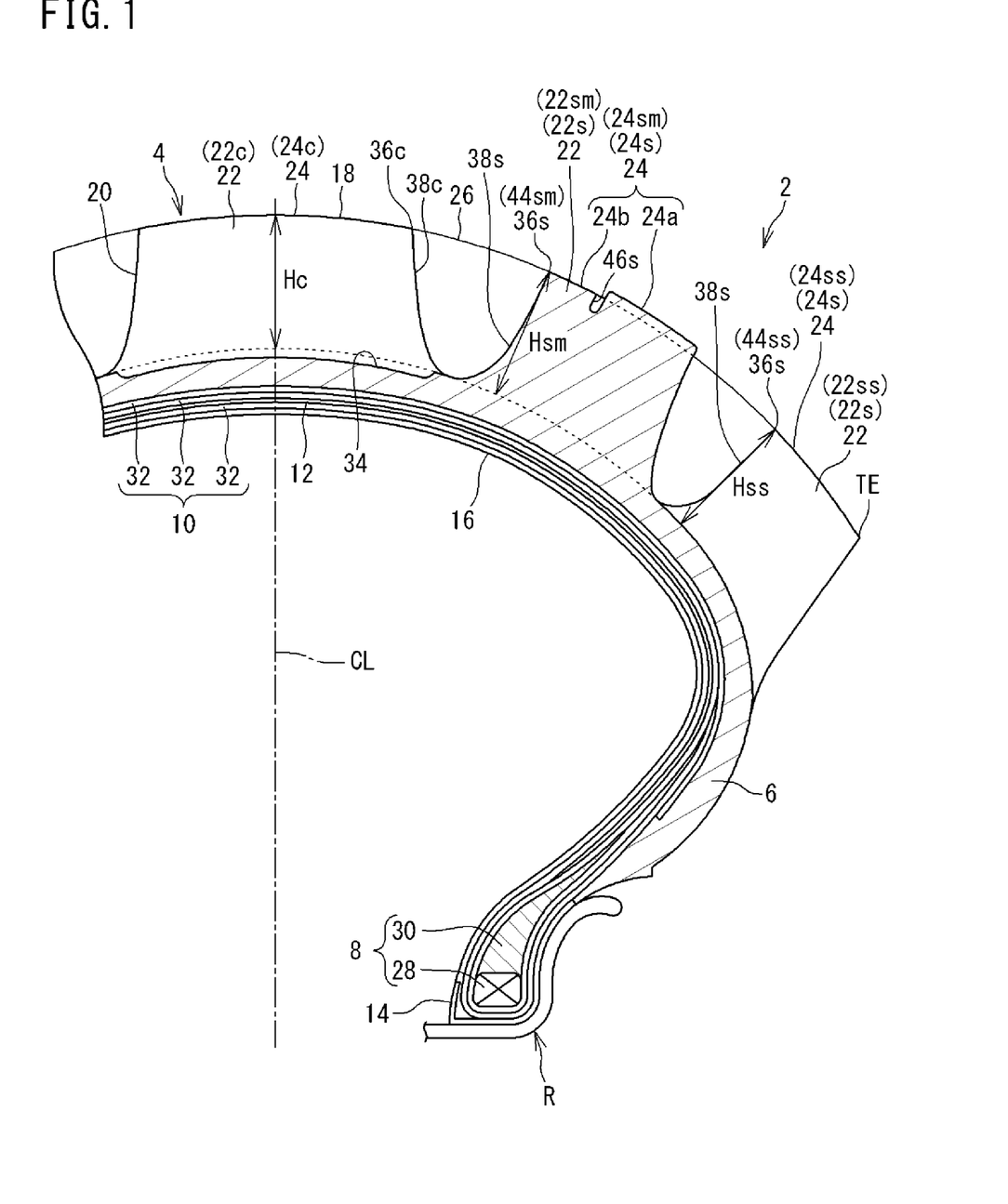
FIG. 1 is a cross-sectional view showing a part of a motorcycle tire according to an embodiment of the present invention.

FIG. 1 shows a part of a motorcycle tire 2 according to an embodiment of the present invention. In FIG. 1, the tire 2 is fitted on a rim R (normal rim) and is in a normal state. The tire 2 is mounted to a motorcycle that runs on rough terrain.

FIG. 1 shows a part of a cross-section of the tire 2 along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. The tire 2 rotates in the circumferential direction about the rotation axis. The circumferential direction of the tire 2 is also the rotation direction of the tire 2. In FIG. 1, an alternate long and short dash line CL represents the equator plane of the tire 2.

The tire 2 includes a tread 4, a pair of sidewalls 6, a pair of beads 8, a carcass 10, an insulation 12, a pair of chafers 14, and an inner liner 16.

The tread 4 is formed from a crosslinked rubber. The tread 4 comes into contact with a road surface at a tread surface 18 thereof. In FIG. 1, reference character TE represents an end of the tread surface 18.

The tread 4 includes a plurality of blocks 22 demarcated by a groove 20. These blocks 22 form a block pattern. The top surface (hereinafter, also referred to as a land surface 24) of each block 22 forms a part of the tread surface 18. Each block 22 provided in the tread 4 includes a land surface 24 that forms a part of the tread surface 18. The portion of the tread surface 18 other than the land surfaces 24 corresponds to the groove 20. On a hard road such as a paved road, the land surfaces 24 come into contact with the road surface. On a soft road, the blocks 22 are pressed into the road surface.

In the tire 2, for convenience, the portion of the tread surface 18 other than the land surfaces 24 is referred to as sea surface 26. The tread surface 18 includes a plurality of the land surfaces 24 and the sea surface 26. In the tread surface 18 of the tire 2, the sum of the areas of the land surfaces 24, that is, the total area of the land surfaces 24, is smaller than the total area of the sea surface 26. Specifically, a land/sea ratio that is represented as the ratio of the total area of the land surfaces 24 to the total area of the sea surface 26 is not less than 10% and not greater than 30%. The land/sea ratio is calculated, for example, on the basis of a development of the tread surface 18 shown in FIG. 2.

Each sidewall 6 is connected to an end of the tread 4. The sidewall 6 extends radially inward along the carcass 10. The sidewall 6 is formed from a crosslinked rubber for which cut resistance is taken into consideration.

Each bead 8 is located radially inward of the sidewall 6. The bead 8 includes a core 28 and an apex 30. The core 28 has a ring shape and includes a steel wire. The apex 30 is located radially outward of the core 28. The apex 30 is formed from a crosslinked rubber that has high stiffness. The apex 30 has a tapered shape.

The carcass 10 is located inward of the tread 4 and the pair of sidewalls 6. The carcass 10 extends on and between one bead 8 and the other bead 8. The carcass 10 includes at least one carcass ply 32. The carcass 10 of the tire 2 includes three carcass plies 32. Each carcass ply 32 includes a large number of carcass cords aligned with each other, which are not shown. These carcass cords are covered with a topping rubber formed from a crosslinked rubber.

The insulation 12 is formed from a crosslinked rubber. In the tire 2, the insulation 12 is disposed between the carcass ply 32 located on the inner side and the carcass ply 32 located at the center, among the three carcass plies 32, so as to extend on and between one bead 8 and the other bead 8.

Each chafer 14 is located radially inward of the bead 8. The chafer 14 comes into contact with the rim R. In the tire 2, the chafer 14 includes a fabric and a rubber with which the fabric is impregnated.

The inner liner 16 is located inward of the carcass 10. The inner liner 16 forms an inner surface of the tire 2. The inner liner 16 is formed from a crosslinked rubber that has a low gas permeability coefficient. The inner liner 16 maintains the internal pressure of the tire 2.

Figure 2:
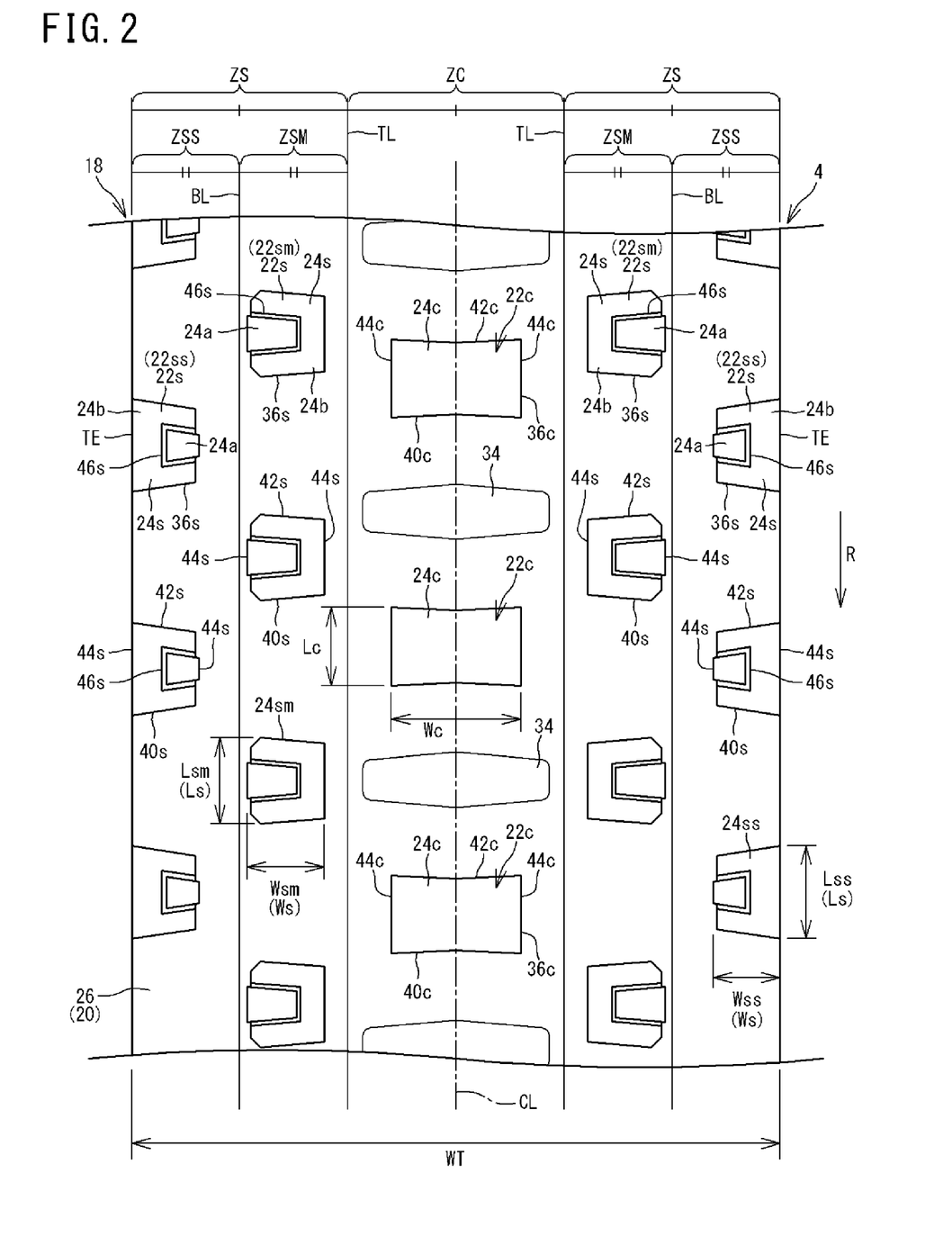
FIG. 2 is a development showing a tread of the tire in FIG. 1.

FIG. 2 shows the tread 4, specifically, the block pattern of the tire 2. In FIG. 2, the right-left direction is the axial direction of the tire 2, and the up-down direction is the circumferential direction of the tire 2. The direction perpendicular to the surface of the sheet of FIG. 2 is the radial direction of the tire 2.

In FIG. 2, the direction indicated by an arrow R is the rotation direction of the tire 2. The tire 2 comes into contact with a road surface from the lower side to the upper side of the surface of the sheet of FIG. 2. The lower side of the surface of the sheet is a rotation direction toe side, and the upper side of the surface of the sheet is a rotation direction heel side.

In FIG. 2, a length indicated by a double-headed arrow WT is a development width of the tread surface 18. The development width WT is represented as the distance, from one end TE of the tread surface 18 to the other end TE of the tread surface 18, measured along the tread surface 18.

In FIG. 2, two solid lines TL located on both sides of the equator plane CL are division lines that divide the development width WT of the tread surface 18 into three equal parts. In the tire 2, a region from one division line TL to the other division line TL is also referred to as a center region ZC. Regions from the division lines TL to the ends TE of the tread surface 18 are also referred to as side regions ZS.

In FIG. 2, a solid line BL located between each division line TL and each end TE of the tread surface 18 is a division line that divides the region from the division line TL to the end TE of the tread surface 18, into two equal parts. In the tire 2, a region, of each side region ZS, from the division line TL to the division line BL is also referred to a middle region ZSM. A region, of each side region ZS, from the division line BL to the end TE of the tread surface 18 is also referred to a shoulder region ZSS.

In the center region ZC, a plurality of center blocks 22*c* are provided. These center blocks 22*c* are located on the equator plane CL. In the tire 2, the plurality of blocks 22 provided in the tread 4 include the plurality of center blocks 22*c* located on the equator plane CL.

In the tire 2, the center blocks 22*c* are arranged at intervals along the equator plane CL. In FIG. 2, the center blocks 22*c* are arranged such that the centers thereof in the axial direction coincide with the equator plane CL, but the arrangement of the center blocks 22*c* is not particularly limited. The center blocks 22*c* may be arranged such that the centers in the axial direction of the center blocks 22*c* are displaced from the equator plane CL. The plurality of center blocks 22*c* may be arranged with the equator plane CL therebetween.

Although not described in detail, in the tire 2, a shallow depression 34 having a depth of not less than 0.5 mm and not greater than 1.5 mm is provided between one center block 22*c* and another center block 22*c*. The depth and shape of the depression 34 are determined as appropriate in accordance with the specifications of the tire 2.

In the tire 2, an edge 36*c* of a land surface 24*c* of each center block 22*c* is the boundary between the land surface 24*c* and a side surface 38*c* (see FIG. 1) of the center block 22*c*. The land surface 24*c* includes a front edge 40*c* located on the rotation direction toe side, a rear edge 42*c* located on the rotation direction heel side, and a pair of side edges 44*c* extending between the front edge 40*c* and the rear edge 42*c*. Each of the front edge 40*c* and the rear edge 42*c* extends in the axial direction. The right and left side edges 44*c* extend in the circumferential direction.

In FIG. 2, a double-headed arrow Wc represents a development width of the center block 22*c*. The development width Wc is represented as the maximum width in the axial direction of the land surface 24*c* of the center block 22*c*. A double-headed arrow Lc represents a development length of the center block 22*c*. The development length Lc is represented as the maximum length in the circumferential direction of the land surface 24*c* of the center block 22*c* in FIG.

2. In the tire 2, from the viewpoint of ensuring the stiffness of the center block 22c, each of the development width Wc and the development length Lc of the center block 22c is set to be not less than 3 mm.

In the tire 2, the development length Lc of each center block 22c is shorter than the development width Wc thereof. Specifically, the ratio (Lc/Wc) of the development length Lc to the development width Wc is preferably not less than 0.40 and more preferably not less than 0.45. The ratio (Lc/Wc) is preferably not greater than 0.74 and more preferably not greater than 0.70.

In FIG. 1, a double-headed arrow Hc represents a height of the center block 22c. The height Hc is represented as the distance from the bottom of the groove 20 to the land surface 24c of the center block 22c at the equator plane CL. In the tire 2, the height Hc of each center block 22c is not less than 11 mm and not greater than 22 mm.

A plurality of side blocks 22s are provided in each side region ZS. These side blocks 22s are located outward of the center blocks 22c in the axial direction. In the tire 2, the plurality of blocks 22 provided in the tread 4 include the plurality of side blocks 22s located outward of the center blocks 22c in the axial direction.

As shown in FIG. 2, in the tire 2, the plurality of side blocks 22s are arranged at intervals in the circumferential direction in each of the middle region ZSM and the shoulder region ZSS. In the tire 2, the side blocks 22s provided in the middle region ZSM are also referred to as middle blocks 22sm, and the side blocks 22s provided in the shoulder region ZS S are also referred to as shoulder blocks 22ss.

As shown in FIG. 2, the middle blocks 22sm provided in the right and left middle regions ZSM are arranged such that the positions in the circumferential direction of the middle blocks 22sm provided in the left middle region ZSM coincide with the positions in the circumferential direction of the middle blocks 22sm provided in the right middle region ZSM. The shoulder blocks 22ss provided in the right and left shoulder regions ZSS are arranged such that the positions in the circumferential direction of the shoulder blocks 22ss provided in the left shoulder region ZSS coincide with the positions in the circumferential direction of the shoulder blocks 22ss provided in the right shoulder region ZSS.

In the tire 2, the middle blocks 22sm are located between the center blocks 22c and the shoulder blocks 22ss in the axial direction. Each shoulder block 22ss includes the end TE of the tread surface 18.

The arrangement of the side blocks 22s in each side region ZS shown in FIG. 2 is an example of the arrangement thereof, and the arrangement of the side blocks 22s in each side region ZS is not particularly limited. The arrangement of the side blocks 22s in each side region ZS is determined as appropriate in accordance with the specifications of the tire 2.

In the tire 2, an edge 36s of a land surface 24s of each side block 22s is the boundary between the land surface 24s and a side surface 38s of the side block 22s. Similar to the above-described center blocks 22c, the land surface 24s also includes a front edge 40s located on the rotation direction toe side, a rear edge 42s located on the rotation direction heel side, and a pair of side edges 44s extending between the front edge 40s and the rear edge 42s. Each of the front edge 40s and the rear edge 42s extends in the axial direction. The right and left side edges 44s extend in the circumferential direction.

As shown in FIG. 2, in the tire 2, a narrow groove 46s is formed in each side block 22s. Accordingly, the land surface 24s is divided into a first land surface 24a and a second land surface 24b that surrounds three sides of the first land surface 24a. As shown in FIG. 1, each side block 22s (that is, middle block 22sm) located in each middle region ZSM is formed such that the height of a portion having the first land surface 24a is larger than the height of a portion having the second land surface 24b. In the tire 2, in the case where the narrow groove 46s is formed in each side block 22s to divide the land surface 24s into the first land surface 24a and the second land surface 24b, the side block 22s may be formed such that the portion having the first land surface 24a has a height equal to that of the portion having the second land surface 24b.

In FIG. 2, a double-headed arrow Wsm represents a development width of the middle block 22sm. The development width Wsm is represented as the maximum width in the axial direction of a land surface 24sm of the middle block 22sm. A double-headed arrow Lsm represents a development length of the middle block 22sm. The development length Lsm is represented as the maximum length in the circumferential direction of the land surface 24sm of the middle block 22sm. In the tire 2, from the viewpoint of ensuring the stiffness of the middle block 22sm, each of the development width Wsm and the development length Lsm of the middle block 22sm is set so as to be not less than 3 mm.

In FIG. 2, a double-headed arrow Wss represents a development width of the shoulder block 22ss. The development width Wss is represented as the maximum width in the axial direction of a land surface 24ss of the shoulder block 22ss. A double-headed arrow Lss represents a development length of the shoulder block 22ss. The development length Lss is represented as the maximum length in the circumferential direction of the land surface 24ss of the shoulder block 22ss. In the tire 2, from the viewpoint of ensuring the stiffness of the shoulder block 22ss, each of the development width Wss and the development length Lss of the shoulder block 22ss is set so as to be not less than 3 mm.

The middle blocks 22sm and the shoulder blocks 22ss are each a part of the side blocks 22s. The development widths Wsm of the middle blocks 22sm and the development widths Wss of the shoulder blocks 22ss are also development widths Ws of the side blocks 22s. The development lengths Lsm of the middle blocks 22sm and the development lengths Lss of the shoulder blocks 22ss are also development lengths Ls of the side blocks 22s.

In the tire 2, the ratio (Ls/Ws) of the development length Ls to the development width Ws is preferably not less than 0.77 and more preferably not less than 1.00. The ratio (Ls/Ws) is preferably not greater than 1.89 and more preferably not greater than 1.55. More specifically, the ratio (Lsm/Wsm) of the development length Lsm to the development width Wsm of each middle block 22sm is preferably not less than 0.77 and more preferably not less than 1.00. The ratio (Lsm/Wsm) is preferably not greater than 1.45 and more preferably not greater than 1.30. The ratio (Lss/Wss) of the development length Lss to the development width Wss of each shoulder block 22ss is preferably not less than 1.00 and more preferably not less than 1.25. The ratio (Lss/Wss) is preferably not greater than 1.89 and more preferably not greater than 1.55.

In FIG. 1, a double-headed arrow Hsm represents a height of the middle block 22sm. The height Hsm is represented as the distance from the bottom of the groove 20 to the land surface 24sm at a side edge 44sm located on the equator plane side of the middle block 22sm. A double-headed arrow Hss represents a height of the shoulder block 22ss. The height Hss is represented as the distance from the bottom of the groove 20 to the land surface 24ss at a side edge 44ss located on the equator plane side of the shoulder block 22ss.

As described above, the middle blocks 22sm and the shoulder blocks 22ss are each a part of the side blocks 22s. The heights Hsm of the middle blocks 22sm and the heights Hss of the shoulder blocks 22ss are also heights Hs of the side blocks 22s.

In the tire 2, the ratio (Hs/Hc) of the height Hs of each side block 22s to the height Hc of each center block 22c is not less than 0.9 and not greater than 1.1. More specifically, the ratio (Hsm/Hc) of the height Hsm of each middle block 22sm to the height Hc of each center block 22c is not less than 0.9 and not greater than 1.1, and the ratio (Hss/Hc) of the height Hss of each shoulder block 22ss to the height Hc of each center block 22c is not less than 0.9 and not greater than 1.1.

In the tire 2, traction is generated by the blocks 22 scratching a road surface. Each block 22 comes into contact with the road surface when the tire 2 rotates. Due to the contact with the road surface, a load is applied to the block 22 and the block 22 becomes deformed. Since the tire 2 rotates, the block 22 is in contact with the road surface for a moment. Therefore, if each block 22 is formed from a crosslinked rubber having high stress when strain is momentarily applied thereto, specifically, a crosslinked rubber that has a high complex elastic modulus, deformation of the block 22 due to momentary application of a load to the block 22 is suppressed, so that high traction can be generated.

The tire 2 generates heat due to running. The tire 2 in a running state has a temperature of about 70° C.

In the tire 2, a complex elastic modulus (hereinafter, also referred to as complex elastic modulus E*) at a maximum strain amplitude of 1% and a temperature of 70° C. of each block 22 is not less than 10.0 MPa. The block 22 has a high complex elastic modulus E* in a state where the tire 2 is running. In the tire 2, deformation of the block 22 due to momentary application of a load to the block 22 is suppressed. With the block 22, high traction is obtained. The tire 2 has excellent traction performance From this viewpoint, the complex elastic modulus E* of each block 22 is preferably not less than 10.5 MPa and more preferably not less than 11.0 MPa.

When a rider slides the tire 2, the rider tilts a vehicle body that is in an upright attitude. At this time, a contact region of the tire 2 that is in contact with the road surface shifts from the center region ZC to the side region ZS. When the rider returns the vehicle body from the tilted attitude to the upright attitude, the contact region of the tire 2 shifts from the side region ZS to the center region ZC. The time required for this shift depends on the movement of the rider. This shift time is longer than the time for which the above-described block 22 is in contact with the road surface and which depends on the rotation speed of the tire 2. Therefore, if each block 22 is formed from a crosslinked rubber having low stress when strain is applied thereto over time, specifically, a crosslinked rubber having a low 300% modulus, when the contact region of the tire 2 that is in contact with the road surface shifts from the center region ZC to the side region ZS or shifts from the side region ZS to the center region ZC, the block 22 can become flexibly deformed in accordance with a load applied to the block 22, so that sudden behavior of the tire 2 can be prevented.

In the tire 2, a 300% modulus (hereinafter, also referred to as 300% modulus M) at a temperature of 75° C. of each block 22 is not greater than 6.0 MPa. In the block 22, the 300% modulus M is appropriately maintained in a state where the tire 2 is running. The block 22 becomes deformed in accordance with a load applied to the block 22 when the contact region of the tire 2 that is in contact with the road surface shifts from the center region ZC to the side region ZS or shifts from the side region ZS to the center region ZC. Since the block 22 becomes flexibly deformed, in the case of sliding the tire 2, the tire 2 is prevented from suddenly starting to slide. The tire 2 has excellent slide control performance From this viewpoint, the 300% modulus M of each block 22 is preferably not greater than 5.5 MPa and more preferably not greater than 5.0 MPa.

In the tire 2, the complex elastic modulus E* at a maximum strain amplitude of 1% and a temperature of 70° C. of each block 22 is not less than 10.0 MPa, and the 300% modulus M at a temperature of 75° C. of each block 22 is not greater than 6.0 MPa. In the tire 2, it is possible to achieve both traction performance and slide control performance.

As described above, each block 22 of the tire 2 is formed from a crosslinked rubber. The physical properties such as the complex elastic modulus E* and the 300% modulus M of the crosslinked rubber are controlled on the basis of the blending formula of a rubber composition for the crosslinked rubber. However, the 300% modulus M also tends to increase when the complex elastic modulus E* is increased, and the complex elastic modulus E* also tends to decrease when the 300% modulus M is decreased. Thus, it is difficult to decrease the 300% modulus M while increasing the complex elastic modulus E*. However, in order to obtain a block 22 having a high complex elastic modulus E* and a low 300% modulus M, the present inventors have conducted a thorough study for a rubber composition used for forming this block 22, and, as a result, the present inventors have found that an increase in complex elastic modulus E* and a decrease in 300% modulus M can be achieved by using a specific carbon black, and that the effect of this carbon black can be enhanced by using a specific base rubber, and have obtained a block 22 formed from a crosslinked rubber having a high complex elastic modulus E* and a low 300% modulus M.

In the tire 2, preferably, a rubber composition for each block 22 contains a carbon black, and this carbon black has properties shown in (C1) and (C2) below.

Property (C1):
The cetyltrimethylammonium bromide (CTAB) specific surface area of the carbon black is not less than 160 $m^2/g$.

Property (C2):
The compressed oil absorption number (COAN) of the carbon black is not greater than 110 $cm^3/100$ g.

By using the carbon black having the above-described properties (C1) and (C2), the complex elastic modulus of the crosslinked rubber can be increased, and the 300% modulus of the crosslinked rubber can be decreased. The reason for this is not necessarily clear but can be inferred as follows.

This carbon black is a carbon black that has a CTAB specific surface area of not less than 160 $m^2/g$ and that has a small grain shape, and thus the interaction between the carbon black and the base rubber is enhanced. Since the reinforcing properties by the carbon black is improved, a crosslinked rubber having high stress when strain is momentarily applied thereto, that is, a crosslinked rubber having a high complex elastic modulus E*, is obtained by using this carbon black. Meanwhile, this carbon black is a carbon black that has a COAN of not greater than 110 $cm^3/100$ g and that has a small structure, and thus the interaction between the base rubber and the carbon black is appropriately maintained. Since the reinforcing effect in a deformation mode where strain is applied over time is weakened, a crosslinked rubber having low stress when strain is applied thereto over time, that is, a crosslinked rubber having a low 300% modulus M, is obtained.

In the tire 2, from the viewpoint of obtaining a crosslinked rubber having a high complex elastic modulus E* and a low 300% modulus M, the amount of the carbon black contained in the rubber composition for each block 22, per 100 parts by mass of the base rubber, is preferably not less than 2 parts by mass, more preferably not less than 5 parts by mass, further preferably not less than 10 parts by mass, and particularly preferably not less than 45 parts by mass. The amount of the carbon black per 100 parts by mass of the base rubber is preferably not greater than 200 parts by mass, more preferably not greater than 100 parts by mass, further preferably not greater than 80 parts by mass, and particularly preferably not greater than 70 parts by mass.

A person skilled in the art can produce a carbon black by a known production method when target properties are determined. Although not described in detail, the carbon black having the above-described properties (C1) and (C2) is also produced by a known production method. The production method is not particularly limited, but specifically, a method of spraying a raw material oil into combustion gas to produce a carbon black is adopted. For example, conventionally known methods such as a furnace method and a channel method are used, but among the known methods, the furnace method is preferable.

The effect of the above-described carbon black is further enhanced by using a base rubber having properties shown in (P1) and (P2) below. That is, in the tire 2, the base rubber of the rubber composition for each block 22 preferably has the properties shown in (P1) and (P2) below.

Property (P1):
 The weight-average molecular weight (Mw) of the base rubber is not less than 400 thousand and not greater than 1.5 million.

Property (P2):
 The glass transition temperature (Tg) of the base rubber is not lower than −30° C. and not higher than −5° C.

By using the base rubber having the above-described properties (P1) and (P2), the complex elastic modulus E* of the crosslinked rubber can be effectively increased, and the 300% modulus M of the crosslinked rubber can be effectively decreased. Furthermore, by forming each block 22 from this crosslinked rubber, good traction performance and slide control performance are stably exhibited. The reason for this is not necessarily clear but can be inferred as follows.

In the tire 2, the weight-average molecular weight (Mw) of the base rubber contained in the rubber composition for each block 22 is not less than 400 thousand and not greater than 1.5 million. This base rubber contributes to setting the complex elastic modulus E* and the 300% modulus M of the crosslinked rubber to desired values. Furthermore, this base rubber is a base rubber having a glass transition temperature (Tg) of not lower than −30° C. and not higher than −5° C. The tire 2 generates heat due to running, but this base rubber suppresses performance changes in the temperature range of the tire 2 in a running state. By using this base rubber, fluctuations of the complex elastic modulus E* and the 300% modulus M in a running state of the tire 2 are effectively suppressed. That is, by using the base rubber together with the above-described carbon black, a block 22 whose complex elastic modulus E* and 300% modulus M are appropriately controlled can be obtained, and this block 22 can contribute to stably exhibiting good traction performance and slide control performance.

As described above, examples of the base rubber of the rubber composition include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene-rubber (IIR). In the tire 2, as the base rubber, one rubber may be used alone, or two or more rubbers may be used in combination. In the tire 2, from the viewpoint of stably exhibiting good traction performance and slide control performance, as the base rubber contained in the rubber composition for each block 22, NR, BR, SBR, and IR are preferable, BR and SBR are more preferable, and SBR is further preferable. In the case where SBR is used as the base rubber, the base rubber preferably contains the SBR as a main component. Specifically, the amount of the SBR contained in the entire base rubber is preferably not less than 60% by mass, more preferably not less than 85% by mass, and further preferably not less than 95% by mass. Particularly preferably, the amount of the SBR contained in the entire base rubber is 100% by mass.

In the tire 2, the SBR used as the base rubber is not particularly limited. An emulsion-polymerized styrene-butadiene rubber (E-SBR), a solution-polymerized styrene-butadiene rubber (S-SBR), and the like can be used.

As described above, in the tire 2, the complex elastic modulus E* at a maximum strain amplitude of 1% and a temperature of 70° C. of each block 22 is not less than 10.0 MPa, and the 300% modulus M at a temperature of 75° C. of each block 22 is not greater than 6.0 MPa. The complex elastic modulus E* and the 300% modulus M are controlled on the basis of the blending formula of the rubber composition for the crosslinked rubber. Therefore, there is a concern that an excessively high complex elastic modulus E* increases the 300% modulus M and reduces the slide control performance. In addition, there is a concern that an excessively low 300% modulus M decreases the complex elastic modulus E* and reduces the traction performance From the viewpoint of being able to control the traction performance and the slide control performance in a well-balanced manner, the complex elastic modulus E* at a maximum strain amplitude of 1% and a temperature of 70° C. of each block 22 is preferably not greater than 15.0 MPa, more preferably not greater than 13.0 MPa, and further preferably not greater than 12.0 MPa. From the same viewpoint, the 300% modulus M at a temperature of 75° C. of each block 22 is preferably not less than 3.0 MPa, more preferably not less than 3.5 MPa, and further preferably not less than 4.0 MPa.

Figure 3:
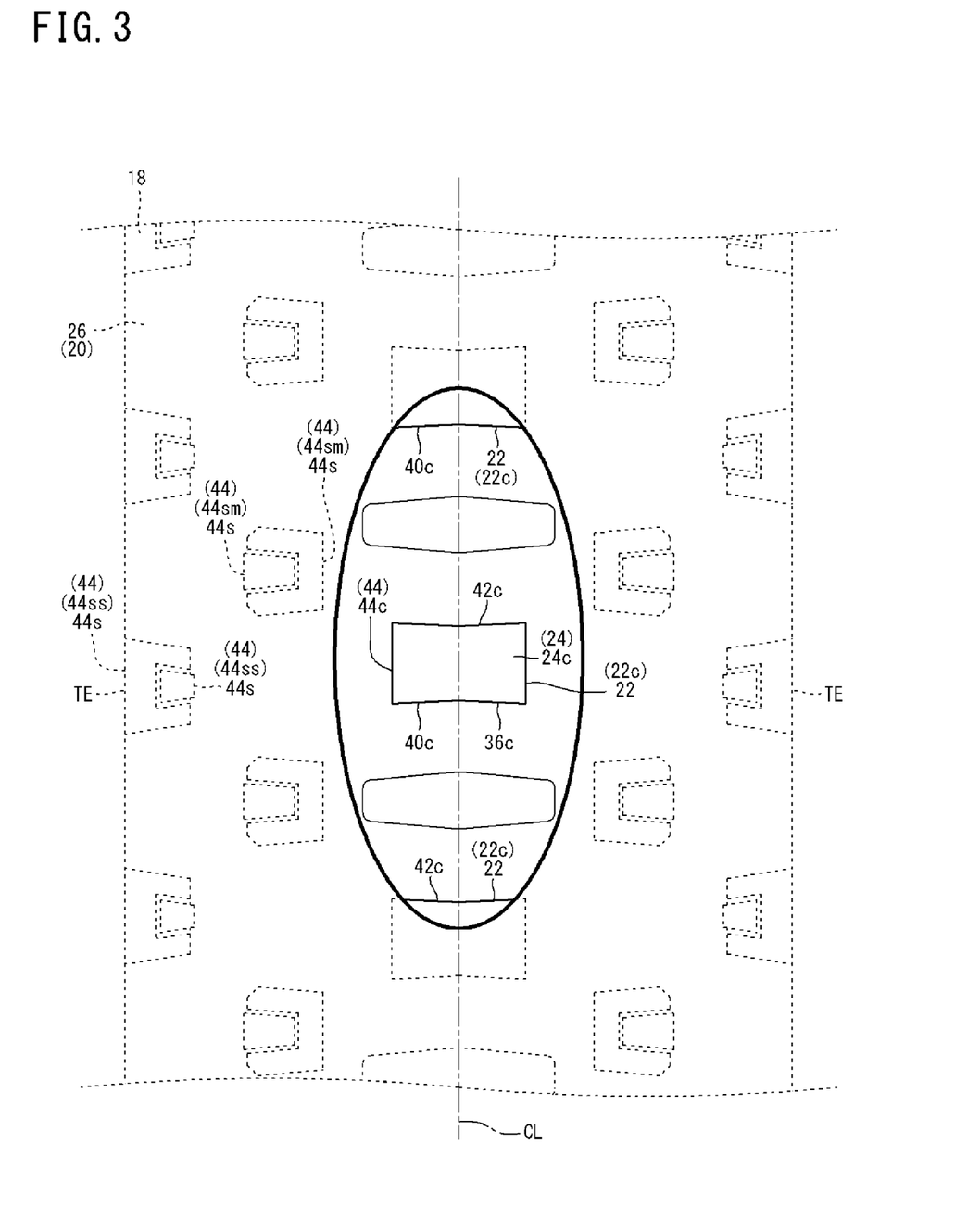
FIG. 3 is a schematic diagram showing a ground contact state in an upright attitude.
Figure 4:
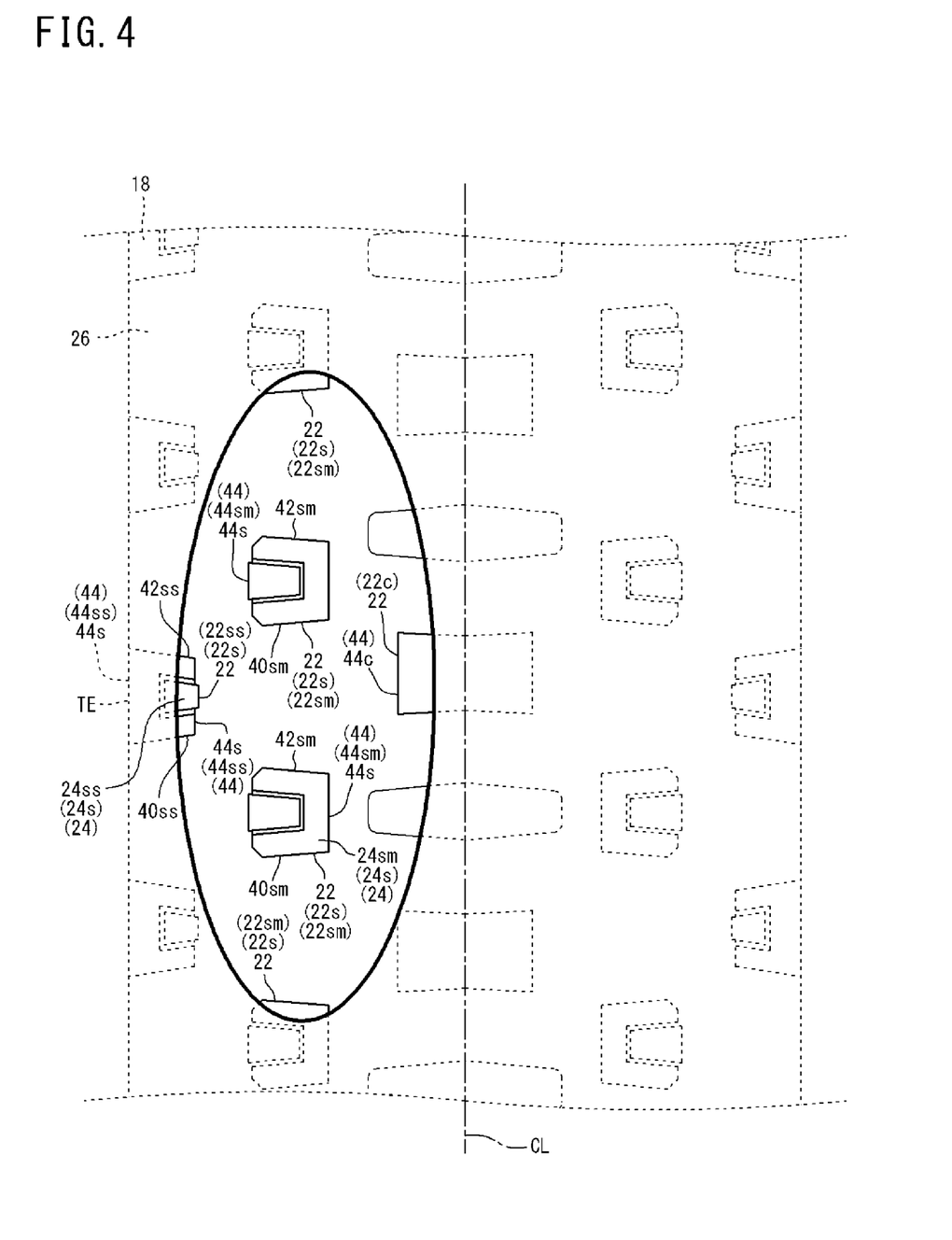
FIG. 4 is a schematic diagram showing a ground contact state in a tilted attitude.

FIG. 3 and FIG. 4 each schematically show a ground contact state of the tire 2. FIG. 3 and FIG. 4 each show the contours of the blocks 22 located in a ground-contact surface region. In FIG. 3 and FIG. 4, the right-left direction corresponds to the axial direction of the tire 2. The up-down direction corresponds to the circumferential direction of the tire 2. The ground-contact surface region of the tire 2 is obtained by bringing the tire 2 into contact with a flat road surface, using a tire ground-contact surface shape measuring device (not shown).

In FIG. 3 and FIG. 4, the region surrounded by an ellipse is the ground-contact surface region of the tire 2. The ground-contact surface region is specified on the basis of the outer edge of a ground-contact surface region grasped from the ground-contact state of each block 22.

The ground-contact surface region is obtained by fitting the tire 2 onto the rim R, adjusting the internal pressure of the tire 2 to 80 kPa, and bringing the tire 2 into contact with a road surface with the camber angle of the tire 2 being set to 0° or 30° and with a vertical load being applied to the tire 2. For obtaining the ground-contact surface region, a load of 0.96 kN is applied as the vertical load to the tire 2 in the case where the nominal rim diameter of the tire 2 is not less than 18 inches, and a load of 0.74 kN is applied as the vertical load to the tire 2 in the case where the nominal rim diameter of the tire 2 is less than 18 inches.

The ground-contact surface region shown in FIG. 3 is a ground-contact surface region obtained by bringing the tire 2 into contact with a road surface with the camber angle of the tire 2 being set to 0°. This ground-contact surface region is a ground-contact surface region in an upright attitude, and corresponds to a ground-contact surface region during straight running. The ground-contact surface region in the upright attitude shown in FIG. 3 includes three blocks 22 in total, specifically, three center blocks 22c.

The ground-contact surface region shown in FIG. 4 is a ground-contact surface region obtained by bringing the tire 2 into contact with a road surface with the camber angle of the tire 2 being set to 30°. This ground-contact surface region is a ground-contact surface region in a tilted attitude, and corresponds to a ground-contact surface region during slide running. The ground-contact surface region in the tilted attitude shown in FIG. 4 includes six blocks 22 in total, specifically, one center block 22c, four middle blocks 22sm, and one shoulder block 22ss.

When the rider tilts the vehicle body in order to slide the tire 2, the ground-contact surface region of the tire 2 shifts from the ground-contact surface region in the upright attitude shown in FIG. 3 to the ground-contact surface region in the tilted attitude shown in FIG. 4. When the rider returns the attitude of the vehicle body, the ground-contact surface region of the tire 2 shifts from the ground-contact surface region in the tilted attitude shown in FIG. 4 to the ground-contact surface region in the upright attitude shown in FIG. 3.

As shown in FIG. 3, during straight running, the center blocks 22c come into contact with the road surface. Traction is generated by each center block 22c scratching the road surface at the front edge 40c on the rotation direction toe side of the center block 22c. When the front edge 40c has high stiffness, high traction is obtained.

In the tire 2, from the viewpoint that the front edge 40c can effectively contribute to generation of traction, the product (E*·Wc/WT) of the complex elastic modulus E* at a maximum strain amplitude of 1% and a temperature of 70° C. of each block 22 and the ratio (Wc/WT) of the development width Wc of each center block 22c to the development width WT of the tread surface 18, is preferably not less than 1.90 MPa and more preferably not less than 1.95 MPa.

When the rider tilts the vehicle body in order to slide the tire 2, load movement from the equator plane CL toward the end TE of the tread surface 18 occurs. In the tire 2, the edge 36c of the land surface 24c of each center block 22c includes the rear edge 42c, in addition to the above-described front edge 40c, as an edge extending in the axial direction. The stiffness of the front edge 40c and the rear edge 42c affects flexible deformation of the center block 22c due to the load movement. From the viewpoint of maintaining good slide control performance, the product (E*·Wc/WT) of the complex elastic modulus E* and the ratio (Wc/WT) is preferably not greater than 3.25 MPa and more preferably not greater than 3.20 MPa.

In the tire 2, the side edge 44c of each center block 22c, the side edge 44sm on the equator plane side of each middle block 22sm, the side edge 44sm on the end TE side of the tread surface 18 of each middle block 22sm, and the side edge 44ss on the equator plane side of each shoulder block 22ss are located between the equator plane CL and each end TE of the tread surface 18. Therefore, due to the load movement occurring when the rider tilts the vehicle body in order to slide the tire 2, the side edges 44c of the center blocks 22c, the side edges 44sm on the equator plane side of the middle blocks 22sm, the side edges 44sm on the end side of the tread surfaces 18 of the middle blocks 22sm, and the side edges 44ss on the equator plane side of the shoulder blocks 22ss are pressed in this order. The stiffness of each side edge 44 affects flexible deformation of the center blocks 22c, the middle blocks 22sm, and the shoulder blocks 22ss due to the load movement.

In the tire 2, the product (M·Lc/WT) of the 300% modulus M at a temperature of 75° C. of each block 22 and the ratio (Lc/WT) of the development length Lc of each center block 22c to the development width WT of the tread surface 18 is preferably not greater than 0.84 MPa. Accordingly, the stiffness of the side edges 44c of each center block 22c is appropriately maintained. Since each center block 22c becomes flexibly deformed, good slide control performance is achieved. From this viewpoint, the product (M·Lc/WT) is more preferably not greater than 0.80 MPa. The stiffness of the side edges 44c of each center block 22c affects traction performance From the viewpoint of maintaining good traction performance, the product (M·Lc/WT) is preferably not less than 0.20 MPa and more preferably not less than 0.23 MPa.

In the tire 2, the product (M·Lsm/WT) of the 300% modulus M at a temperature of 75° C. of each block 22 and the ratio (Lsm/WT) of the development length Lsm of each middle block 22sm to the development width WT of the tread surface 18 is preferably not greater than 0.96 MPa. Accordingly, the stiffness of the side edges 44sm of each middle block 22sm is appropriately maintained. Since each middle block 22sm becomes flexibly deformed, good slide control performance is achieved. From this viewpoint, the product (M·Lsm/WT) is more preferably not greater than 0.90 MPa. The stiffness of the side edges 44sm of each middle block 22sm affects traction performance. From the viewpoint of maintaining good traction performance, the product (M·Lsm/WT) is preferably not less than 0.20 MPa and more preferably not less than 0.25 MPa.

In the tire 2, the product (M·Lss/WT) of the 300% modulus M at a temperature of 75° C. of each block 22 and the ratio (Lss/WT) of the development length Lss of each shoulder block 22ss to the development width WT of the tread surface 18 is preferably not greater than 1.02 MPa. Accordingly, the stiffness of the side edges 44ss of each shoulder block 22ss is appropriately maintained. Since each shoulder block 22ss becomes flexibly deformed, good slide control performance is achieved. From this viewpoint, the product (M·Lss/WT) is more preferably not greater than 0.95 MPa. The stiffness of the side edges 44ss of each shoulder block 22ss affects traction performance From the viewpoint of maintaining good traction performance, the product (M·Lss/WT) is preferably not less than 0.21 MPa and more preferably not less than 0.25 MPa.

As described above, the middle blocks 22sm and the shoulder blocks 22ss are each a part of the side blocks 22s. Therefore, from the viewpoint of achieving good slide control performance, the product (M·Ls/WT) of the 300% modulus M at a temperature of 75° C. of each block 22 and the ratio (Ls/WT) of the development length Ls of each side block 22s to the development width WT of the tread surface 18 is preferably not greater than 1.02 MPa. From the viewpoint of maintaining good traction performance, the product (M·Ls/WT) is preferably not less than 0.20 MPa.

During slide running in which the ground-contact surface region shown in FIG. 4 is formed, the middle blocks 22*sm* mainly come into contact with the road surface. Traction is generated by each of the middle blocks 22*sm* scratching the road surface at a front edge 40*sm* on the rotation direction toe side of the middle block 22*sm*. When the front edge 40*sm* has high stiffness, high traction is obtained during slide running.

In the tire 2, from the viewpoint that the front edge 40*sm* of each middle block 22*sm* can effectively contribute to generation of traction, the product (E*·Wsm/WT) of the complex elastic modulus E* at a maximum strain amplitude of 1% and a temperature of 70° C. of each block 22 and the ratio (Wsm/WT) of the development width Wsm of each middle block 22*sm* to the development width WT of the tread surface 18 is preferably not less than 1.10 MPa and more preferably not less than 1.15 MPa.

Similar to the center blocks 22*c*, the land surface 24*sm* of each middle block 22*sm* also includes a rear edge 42*sm*, in addition to the above-described front edge 40*sm*, as an edge extending in the axial direction. Therefore, the stiffness of the front edge 40*sm* and the rear edge 42*sm* of the middle block 22*sm* affects flexible deformation of the middle block 22*sm* due to the load movement when the rider tilts the vehicle body in order to slide the tire 2. From the viewpoint of maintaining good slide control performance, the product (E*·Wsm/WT) of the complex elastic modulus E* and the ratio (Wsm/WT) is preferably not greater than 1.69 MPa and more preferably not greater than 1.65 MPa.

As shown in FIG. 4, the shoulder blocks 22*ss* also come into contact with the road surface during slide running. Traction is generated by each of the shoulder blocks 22*ss* scratching the road surface at a front edge 40*ss* on the rotation direction toe side of the shoulder block 22*ss*. When this front edge 40*ss* has high stiffness, high traction is obtained during slide running.

In the tire 2, from the viewpoint that the front edge 40*ss* of each shoulder block 22*ss* can effectively contribute to generation of traction, the product (E*·Wss/WT) of the complex elastic modulus E* at a maximum strain amplitude of 1% and a temperature of 70° C. of each block 22 and the ratio (Wss/WT) of the development width Wss of each shoulder block 22*ss* to the development width WT of the tread surface 18 is preferably not less than 0.90 MPa and more preferably not less than 0.95 MPa.

Similar to the center blocks 22*c*, the land surface 24*ss* of each shoulder block 22*ss* also includes a rear edge 42*ss*, in addition to the above-described front edge 40*ss*, as an edge extending in the axial direction. Therefore, the stiffness of the front edge 40*ss* and the rear edge 42*ss* of the shoulder block 22*ss* affects flexible deformation of the shoulder block 22*ss* due to the load movement when the rider tilts the vehicle body in order to slide the tire 2. From the viewpoint of maintaining good slide control performance, the product (E*·Wss/WT) of the complex elastic modulus E* and the ratio (Wss/WT) is preferably not greater than 1.43 MPa and more preferably not greater than 1.40 MPa.

As described above, the middle blocks 22*sm* and the shoulder blocks 22*ss* are each a part of the side blocks 22*s*. Therefore, from the viewpoint of achieving good traction performance, the product (E*·Ws/WT) of the complex elastic modulus E* at a maximum strain amplitude of 1% and a temperature of 70° C. of each block 22 and the ratio (Ws/WT) of the development width Ws of each side block 22*s* to the development width WT of the tread surface 18 is preferably not less than 0.90 MPa. From the viewpoint of maintaining good slide control performance, the product (E*·Ws/WT) is preferably not greater than 1.69 MPa.

In the tire 2, from the viewpoint of achieving good traction performance, the ratio (Wc/WT) of the development width Wc of each center block 22*c* to the development width WT of the tread surface 18 is preferably not less than 0.15 and more preferably not less than 0.19. From the viewpoint of maintaining good slide control performance, the ratio (Wc/WT) is preferably not greater than 0.33 and more preferably not greater than 0.25.

In the tire 2, from the viewpoint of maintaining good traction performance, the ratio (Lc/WT) of the development length Lc of each center block 22*c* to the development width WT of the tread surface 18 is preferably not less than 0.05 and more preferably not less than 0.07. From the viewpoint of achieving good slide control performance, the ratio (Lc/WT) is preferably not greater than 0.28 and more preferably not greater than 0.14.

In the tire 2, from the viewpoint of achieving good traction performance, the ratio (Wsm/WT) of the development width Wsm of each middle block 22*sm* to the development width WT of the tread surface 18 is preferably not less than 0.08 and more preferably not less than 0.11. From the viewpoint of maintaining good slide control performance, the ratio (Wsm/WT) is preferably not greater than 0.17 and more preferably not greater than 0.13.

In the tire 2, from the viewpoint of achieving good traction performance, the ratio (Wss/WT) of the development width Wss of each shoulder block 22*ss* to the development width WT of the tread surface 18 is preferably not less than 0.07 and more preferably not less than 0.09. From the viewpoint of maintaining good slide control performance, the ratio (Wss/WT) is preferably not greater than 0.14 and more preferably not greater than 0.11.

As described above, the middle blocks 22*sm* and the shoulder blocks 22*ss* are each a part of the side blocks 22*s*. Therefore, in the tire 2, from the viewpoint of achieving good traction performance, the ratio (Ws/WT) of the development width Ws of each side block 22*s* to the development width WT of the tread surface 18 is preferably not less than 0.07. From the viewpoint of maintaining good slide control performance, the ratio (Ws/WT) is preferably not greater than 0.17.

In the tire 2, from the viewpoint of maintaining good traction performance, the ratio (Lsm/WT) of the development length Lsm of each middle block 22*sm* to the development width WT of the tread surface 18 is preferably not less than 0.05 and more preferably not less than 0.07. From the viewpoint of maintaining good slide control performance, the ratio (Lsm/WT) is preferably not greater than 0.32 and more preferably not greater than 0.16.

In the tire 2, from the viewpoint of maintaining good traction performance, the ratio (Lss/WT) of the development length Lss of each shoulder block 22*ss* to the development width WT of the tread surface 18 is preferably not less than 0.06 and more preferably not less than 0.07. From the viewpoint of maintaining good slide control performance, the ratio (Lss/WT) is preferably not greater than 0.34 and more preferably not greater than 0.17.

As described above, the middle blocks 22*sm* and the shoulder blocks 22*ss* are each a part of the side blocks 22*s*. Therefore, in the tire 2, from the viewpoint of maintaining good traction performance, the ratio (Ls/WT) of the development length Ls of each side block 22*s* to the development width WT of the tread surface 18 is preferably not less than 0.05 and more preferably not less than 0.07. From the viewpoint of achieving good slide control performance, the ratio (Ls/WT) is preferably not greater than 0.34 and more preferably not greater than 0.17.

As shown in FIG. 3 and FIG. 4, the ground-contact surface region includes a plurality of the blocks 22. The proportion of the land surfaces 24 of the blocks 22 in the ground-contact surface region affects traction performance and slide control performance.

In the tire 2, from the viewpoint of achieving both traction performance and slide control performance, an effective area ratio (Ss/As), in the upright attitude, which is represented as the ratio (Ss/As) of the sum of the areas of the land surfaces 24 of the blocks 22 included in the ground-contact surface region, that is, a total area Ss of the areas of the land surfaces 24, to an area. As of the ground-contact surface region in the upright attitude, is preferably not less than 0.10 and preferably not greater than 0.20.

In the tire 2, from the viewpoint of achieving both traction performance and slide control performance, an effective area ratio (St/At), in the tilted attitude, which is represented as the ratio (St/At) of the sum of the areas of the land surfaces 24 of the blocks 22 included in the ground-contact surface region, that is, a total area St of the areas of the land surfaces 24, to an area At of the ground-contact surface region in the tilted attitude, is preferably not less than 0.10 and preferably not greater than 0.20. In this case, the number of the blocks 22 included in the ground-contact surface region is preferably not less than 3 and more preferably not less than 4. The number of the blocks 22 is preferably less than 12 and more preferably not greater than 11.

In the tire 2, from the viewpoint that the side blocks 22s can become flexibly deformed when the rider tilts the vehicle body in order to slide the tire 2, each of the development width Ws and the development length Ls of at least one side block 22s among the plurality of blocks 22 included in the ground-contact surface region in the tilted attitude is preferably shorter than the height Hs thereof. In this case, each of the development width Wsm and the development length Lsm of the middle block 22sm may be shorter than the height Hsm thereof, or each of the development width Wss and the development length Lss of the shoulder block 22ss may be shorter than the height Hss thereof.

Figure 5:
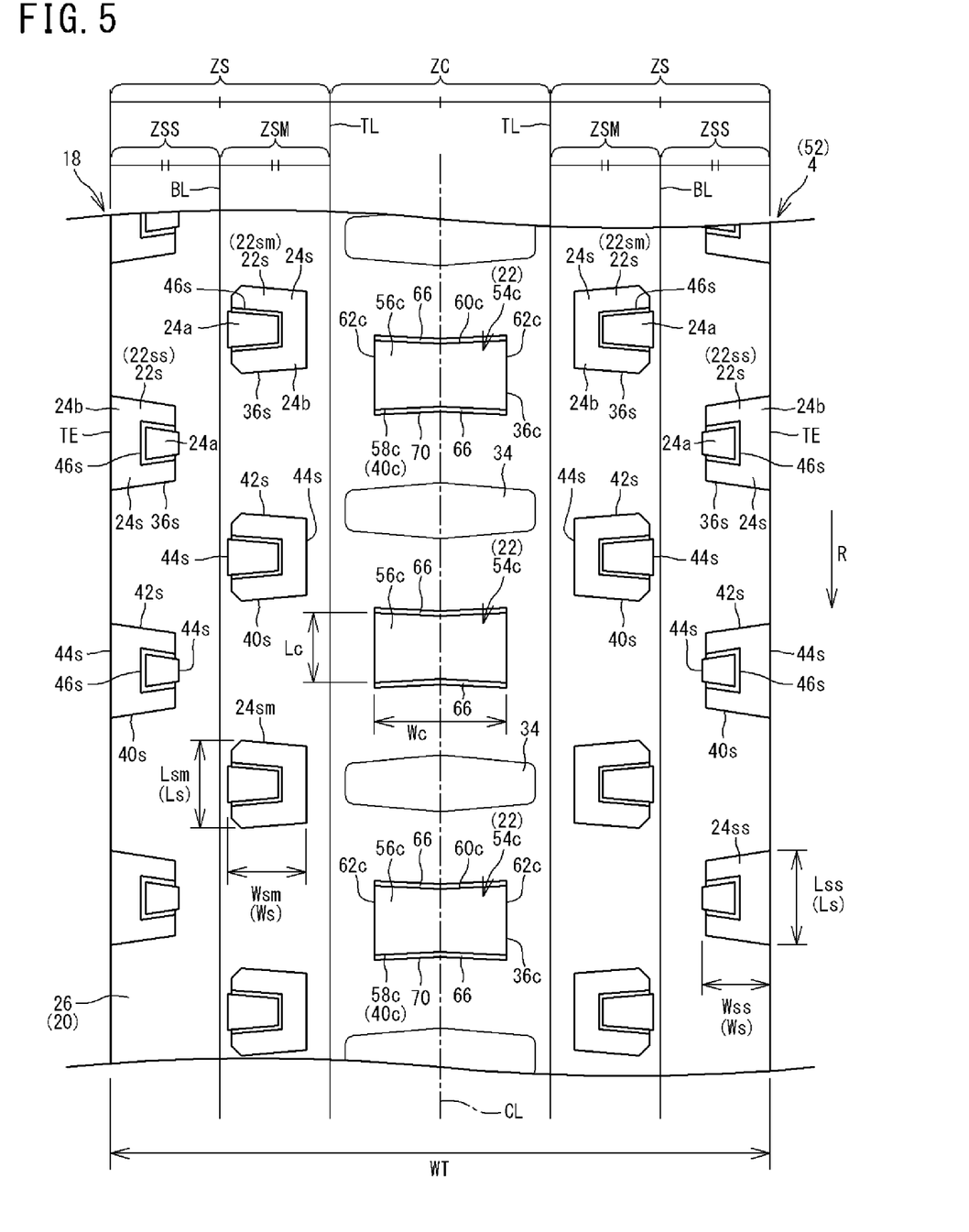
FIG. 5 is a development showing a tread of a motorcycle tire according to another embodiment of the present invention.

FIG. 5 shows a block pattern of a motorcycle tire 52 according to another embodiment of the present invention. In FIG. 5, the right-left direction is the axial direction of the tire 52, and the up-down direction is the circumferential direction of the tire 52. The direction perpendicular to the surface of the sheet of FIG. 5 is the radial direction of the tire 52.

The tire 52 has the same configuration as that of the tire 2 shown in FIG. 1, except for center blocks 54c which form the block pattern. Therefore, the same elements as those of the tire 2 shown in FIG. 1 are designated by the same reference characters, and the description thereof is omitted.

Figure 6:
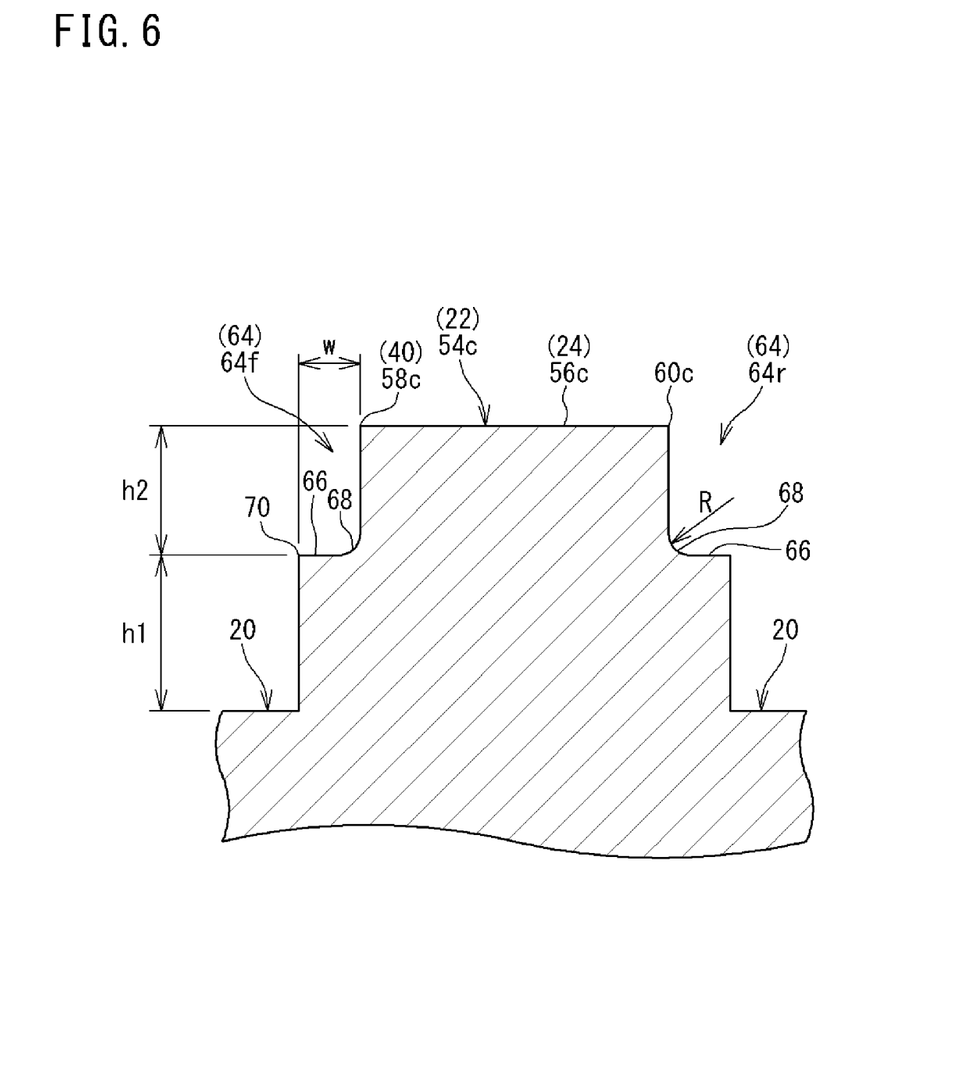
FIG. 6 is an enlarged cross-sectional view showing a cross-section of a center block along an equator plane.

FIG. 6 shows a part of a cross-section of the tire 52 along the equator plane CL. In FIG. 6, the right-left direction is the circumferential direction of the tire 52, and the up-down direction is the radial direction of the tire 52. The direction perpendicular to the surface of the sheet of FIG. 6 is the axial direction of the tire 52.

In the tire 52 as well, a plurality of center blocks 54c are provided in the center region ZC. These center blocks 54c are arranged at intervals along the equator plane CL. Similar to the center blocks 22c shown in FIG. 2, the center blocks 54c are also arranged such that the centers thereof in the axial direction coincide with the equator plane CL.

A land surface 56c of each center block 54c includes a front edge 58c located on the rotation direction toe side, a rear edge 60c located on the rotation direction heel side, and a pair of side edges 62c extending between the front edge 58c and the rear edge 60c. Each of the front edge 58c and the rear edge 60c extends in the axial direction. The right and left side edges 62c extend in the circumferential direction.

In each center block Mc of the tire 52, a step 66 is provided at each of a corner portion 64f located on the rotation direction toe side thereof and a corner portion 64r located at the rotation direction heel side thereof. Although the rotation direction of the tire 52 is designated, the step 66 may be provided only on the rotation direction toe side of the center block 54c. As shown in FIG. 6, a corner 68 of each step 66 is rounded.

In FIG. 6, a double-headed arrow h1 represents the distance from the bottom of the groove 20 to each step 66. The distance h1 is also referred to as a height to the step 66. A double-headed arrow h2 represents the distance from the step 66 to the land surface 56c. The distance h2 is also referred to as a height from the step 66 to the land surface 56c.

In the tire 52, the height h1 to the step 66 is preferably greater than the height h2 from the step 66 to the land surface 56c. Accordingly, when each center block 54c scratches a road surface, an edge 70 of the step 66, in addition to the front edge 58c of the land surface 56c, serves as an edge component that contributes to generation of traction. The tire 52 can achieve further improvement of traction performance.

In the tire 52, the step 66 is provided at the entirety of each corner portion 64. However, the step 66 may be provided at a part of the corner portion 64 as long as the step 66 can contribute to improvement of traction performance. In this case, the step 66 is preferably provided so as to be located at the center of the corner portion 64 in the axial direction.

In the tire 52, the step 66 is provided in each center block 54c. However, from the viewpoint of achieving improvement of traction performance during slide running, a step 66 may be provided in the side blocks 22s, specifically, in the middle blocks 22sm and the shoulder blocks 22ss. That is, in the tire 52, from the viewpoint of further improvement of traction performance, in each of at least some blocks 22 among the plurality of blocks 22 provided in the tread 4, when a step 66 is provided at at least a part of the corner portion 64 located on the rotation direction toe side or the heel side thereof, the height to the step 66 of the block 22 in which the step 66 is provided is denoted by h1, and the height from the step 66 to the land surface 24 of the block 22 is denoted by h2, the height h1 is preferably greater than the height h2.

In FIG. 6, a double-headed arrow w represents the length in the circumferential direction of the step 66. From the viewpoint that the step 66 can contribute to improvement of traction performance, the length w is preferably not less than 2 mm and preferably not greater than 4 mm.

As described above, in the tire 52, when each block 22 scratches a road surface, the edge 70 of the step 66, in addition to the front edge 40 of the land surface 24, effectively contributes to generation of traction. The tire 52 can achieve further improvement of traction performance From this viewpoint, the product (E*·h1/h2) of the complex elastic modulus E* at a maximum strain amplitude of 1% and a temperature of 70° C. of each block 22 and the ratio (h1/h2) of the height h1 to the step 66 to the height h2 from the step 66 to the land surface 24 of each block 22 is preferably not less than 10.2 MPa and more preferably not less than 11.0 MPa. From the viewpoint that each block 22 becomes flexibly deformed and good slide control performance is maintained, the product (E*·h1/h2) is preferably not greater than 14.1 MPa and more preferably not greater than 13.5 MPa.

In the tire 52, from the viewpoint of achieving further improvement of traction performance while maintaining good slide control performance, the ratio (h1/h2) of the height h1 to the step 66 to the height h2 from the step 66 to the land surface 24 of each block 22 is preferably not less than 1.02 and more preferably not less than 1.04. The ratio (h1/h2) is preferably not greater than 1.08 and more preferably not greater than 1.06.

As described above, in the tire 52, it is sufficient that a step 66 is provided in each of at least some blocks 22 among the plurality of blocks 22 provided in the tread 4. Among each center block 54c, each middle block 22sm, and each shoulder block 22ss, each center block 54c has the highest frequency of contact with a road surface. Therefore, the step 66 is preferably provided in each center block 54c among each center block 54c, each middle block 22sm, and each shoulder block 22ss which are provided in the tread 4.

As described above, according to the present invention, the motorcycle tires 2 and 52 that can achieve both traction performance and slide control performance are obtained.

EXAMPLES

The following will describe the present invention in further detail by means of examples, etc., but the present invention is not limited to these examples.

[Rubber Composition]

In order to obtain a rubber composition for a tread, the following base rubber and chemicals were prepared. The materials other than sulfur and a vulcanization accelerator are kneaded under a condition of 150° C. for 5 minutes by using a Banbury mixer manufactured by Kobe Steel, Ltd., to obtain a kneaded product. Next, the sulfur and the vulcanization accelerator were added to the obtained kneaded product, and the mixture was kneaded under a condition of 80° C. for 5 minutes by using an open roll, to obtain a rubber composition.

Five types of rubber compositions, in which the complex elastic modulus E* at a maximum strain amplitude of 1% and a temperature of 70° C. and a 300% modulus M at a temperature of 75° C. measured on a crosslinked rubber were controlled as shown in Table 1 below by adjusting the amounts of a carbon black, an oil, the sulfur, the vulcanization accelerator, a thermosetting resin, and a curing agent, were prepared.

Base rubber (styrene-butadiene rubber (SBR)): 100 parts by mass
  Test product: Mw=1.3 million, Tg=−15° C.
Carbon black: The amount was adjusted as appropriate in a range of 40 to 150 parts by mass according to the complex elastic modulus E* and the 300% modulus M.
  Test product: CTAB specific surface area=250 m$^2$/g, COAN=50 cm$^3$/100 g
Oil: The amount was adjusted as appropriate in a range of 40 to 150 parts by mass according to the complex elastic modulus E* and the 300% modulus M.
  Diana Process AH-24 manufactured by Idemitsu Kosan Co., Ltd.
Wax: 2 parts by mass
  SUNNOC WAX manufactured by Ouchi Shinko Chemical Industrial Co., Ltd.
Antioxidant: 2 parts by mass
  OZONONE 6C manufactured by Seiko Chemical Co., Ltd.
Stearic acid: 2 parts by mass
  Stearic acid "CAMELLIA" manufactured by NOF Corporation
Zinc oxide: 2 parts by mass
  Zinc Oxide Type-1 manufactured by Mitsui Mining & Smelting Co., Ltd.
Sulfur: The amount was adjusted as appropriate in a range of 0.1 to 10 parts by mass according to the complex elastic modulus E* and the 300% modulus M.
  Powdery sulfur (containing 5% of oil) manufactured by Tsurumi Chemical Industry Co., Ltd.
Vulcanization accelerator: The amount was adjusted as appropriate in a range of 0.1 to 10 parts by mass according to the complex elastic modulus E* and the 300% modulus M.
  NOCCELER NS manufactured by Ouchi Shinko Chemical Industrial Co., Ltd.
Thermosetting resin: The amount was adjusted as appropriate in a range of 1 to 5 parts by mass according to the complex elastic modulus E* and the 300% modulus M.
  SUMILITERESIN PR12686E manufactured by Sumitomo Bakelite Co., Ltd.
Curing agent: The amount was adjusted as appropriate in a range of 0.1 to 0.5 parts by mass according to the complex elastic modulus E* and the 300% modulus M.
  NOCCELER H manufactured by Ouchi Shinko Chemical Industrial Co., Ltd.

TABLE 1

|  | A | B | C | D | E |
|---|---|---|---|---|---|
| E* [MPa] | 7.9 | 8.9 | 10.2 | 10.1 | 10.8 |
| M [MPa] | 9.1 | 8.2 | 5.8 | 3.2 | 4.1 |

Example 1

A rubber composition C was formed into the shape of a tread and attached together with other elements, to form an unvulcanized tire (hereinafter, also referred to as uncured tire). The uncured tire was pressurized and heated within a mold under a condition of 170° C. for 10 minutes. Accordingly, a motorcycle tire (size: 120/80-19) having the basic structure shown in FIG. 1 and having specifications shown in Table 2 below was obtained.

Examples 2 and 3 and Comparative Examples 1 and 2

Tires of Examples 2 and 3 and Comparative Examples 1 and 2 were obtained in the same manner as Example 1, except that the rubber composition for the tread was as shown in Table 2 below.

Example 4

A tire of Example 4 was obtained in the same manner as Example 1, except that a step was provided at each of a corner portion located on the rotation direction toe side of each center block and a corner portion located on the rotation direction heel side of each center block as shown in FIG. 5. The length w in the circumferential direction of the step was set to 3 mm, and the ratio (h1/h2) of the height h1 to the step to the height h2 from the step to the land surface of the block was set to 1.05.

[Traction Performance and Slide Control Performance]

A test tire was fitted onto a rim (2.15WM) and inflated with air to adjust the internal pressure thereof to 80 kPa. The tire was mounted to the rear wheel of a test vehicle (motorcycle for motocross racing with an engine displacement of 450 cc). A commercially available tire (80/100-21) fitted onto a rim (1.60WM) and having an internal pressure adjusted to 80 kPa was mounted to the front wheel. The test vehicle was caused to run on a test course for motocross racing, and a test rider having professional skills made evaluations (sensory evaluations) for traction performance and slide control performance. The results are shown as indexes in Table 2 below. The higher the value is, the better the traction performance is. The higher the value is, the better the slide control performance is.

TABLE 2

|  | Comparative Example 1 | Comparative Example 2 | Example 1 | Example 2 | Example 3 | Example 4 |
|---|---|---|---|---|---|---|
| Rubber composition | A | B | C | D | E | E |
| E* [MPa] | 7.9 | 8.9 | 10.2 | 10.1 | 10.8 | 10.8 |
| M [MPa] | 9.1 | 8.2 | 5.8 | 3.2 | 4.1 | 4.1 |
| E* · Wc/WT [MPa] | 1.58 | 1.78 | 2.04 | 2.02 | 2.16 | 2.16 |
| M · Lc/WT [MPa] | 1.09 | 0.98 | 0.70 | 0.38 | 0.49 | 0.37 |
| E* · Wsm/WT [MPa] | 0.95 | 1.07 | 1.22 | 1.21 | 1.30 | 1.30 |
| M · Lsm/WT [MPa] | 1.18 | 1.07 | 0.75 | 0.42 | 0.53 | 0.53 |
| E* · Wss/WT [MPa] | 0.79 | 0.89 | 1.02 | 1.01 | 1.08 | 1.08 |
| M · Lss/WT [MPa] | 1.27 | 1.15 | 0.81 | 0.45 | 0.57 | 0.57 |
| As/Ss [—] | 0.15 | 0.15 | 0.15 | 0.15 | 0.15 | 0.15 |
| At/St [—] | 0.14 | 0.14 | 0.14 | 0.14 | 0.14 | 0.14 |
| Number of blocks | 5 | 5 | 5 | 5 | 5 | 5 |
| E* · h1/h2 [MPa] | — | — | — | — | — | 11.34 |
| Traction | 5.0 | 6.0 | 7.0 | 8.0 | 9.0 | 9.5 |
| Slide control | 5.0 | 5.5 | 7.0 | 8.5 | 9.0 | 9.0 |

As shown in Table 2, both traction performance and slide control performance are achieved in the Examples. From the evaluation results, advantages of the present invention are clear.

INDUSTRIAL APPLICABILITY

The above-described technology to achieve both traction performance and slide control performance can also be applied to various tires.

REFERENCE SIGNS LIST 2, 52 tire
4 tread
18 tread surface
20 groove
22, 22c, 22s, 22sm, 22ss block
24, 24c, 24s, 24sm, 24ss land surface
26 sea surface
40c, 40s, 40sm, 40ss front edge
42c, 42s, 42sm, 42ss rear edge
44, 44c, 44s, 44sm, 44ss side edge
54c center block
56c land surface of center block 54c
58c front edge of center block 54c
60c rear edge of center block 54c
62c side edge of center block 54c
64, 64f, 64r corner portion
66 step

The invention claimed is:

1. A motorcycle tire comprising a tread that comes into contact with a road surface at a tread surface thereof, wherein
the tread includes a plurality of blocks including a center block located on an equator plane and a side block located outward of the center block in an axial direction,
each of the plurality of blocks includes a land surface that forms a part of the tread surface,
in the tread surface, a total area of the land surfaces is smaller than a total area of a portion other than the land surfaces,
a complex elastic modulus at a maximum strain amplitude of 1% and a temperature of 70° C. of each block, according to JIS K6394 as measured with at least an initial strain of 0.15% and a frequency of 10 Hz, is not less than 10.0 MPa, and
a 300% modulus at a temperature of 75° C. of each block, according to JIS K6251, is not greater than 6.0 MPa.

2. The motorcycle tire according to claim 1, wherein a product of the complex elastic modulus and a ratio of a development width of the center block to a development width of the tread surface is not less than 1.90 MPa and not greater than 3.25 MPa.

3. The motorcycle tire according to claim 1, wherein a ratio of a development width of the center block to a development width of the tread surface is not less than 0.19 and not greater than 0.25.

4. The motorcycle tire according to claim 1, wherein a product of the 300% modulus and a ratio of a development length of the center block to a development width of the tread surface is not less than 0.20 MPa and not greater than 0.84 MPa.

5. The motorcycle tire according to claim 1, wherein a ratio of a development length of the center block to a development width of the tread surface is not less than 0.07 and not greater than 0.14.

6. The motorcycle tire according to claim 1, wherein a product of the complex elastic modulus and a ratio of a development width of the side block to a development width of the tread surface is not less than 0.90 MPa and not greater than 1.69 MPa.

7. The motorcycle tire according to claim 1, wherein a ratio of a development width of the side block to a development width of the tread surface is not less than 0.07 and not greater than 0.17.

8. The motorcycle tire according to claim 1, wherein a product of the 300% modulus and a ratio of a development length of the side block to a development width of the tread surface is not less than 0.20 MPa and not greater than 1.02 MPa.

9. The motorcycle tire according to claim 1, wherein a ratio of a development length of the side block to a development width of the tread surface is not less than 0.05 and not greater than 0.34.

10. The motorcycle tire according to claim 1, wherein
a ground-contact surface region, in an upright attitude, which is obtained by fitting the tire onto a normal rim, adjusting an internal pressure of the tire to 80 kPa, and bringing the tire into contact with a road surface with a camber angle of the tire being set to 0° and with a load of 0.96 kN being applied as a vertical load to the tire in a case where a nominal rim diameter of the tire is not less than 18 inches or with a load of 0.74 kN being applied as a vertical load to the tire in a case where the nominal rim diameter of the tire is less than 18 inches, includes a plurality of the blocks, and
an effective area ratio, in the upright attitude, which is represented as a ratio of a total area of the land surfaces of the blocks included in the ground-contact surface region to an area of the ground-contact surface region in the upright attitude, is not less than 0.10 and not greater than 0.20.

11. The motorcycle tire according to claim 1, wherein
a ground-contact surface region, in a tilted attitude, which is obtained by fitting the tire onto a normal rim, adjusting an internal pressure of the tire to 80 kPa, and bringing the tire into contact with a road surface with a camber angle of the tire being set to 30° and with a load of 0.96 kN being applied as a vertical load to the tire in a case where a nominal rim diameter of the tire is not less than 18 inches or with a load of 0.74 kN being applied as a vertical load to the tire in a case where the nominal rim diameter of the tire is less than 18 inches, includes a plurality of the blocks, and
an effective area ratio, in the tilted attitude, which is represented as a ratio of a total area of the land surfaces of the blocks included in the ground-contact surface region to an area of the ground-contact surface region in the tilted attitude, is not less than 0.10 and not greater than 0.20.

12. The motorcycle tire according to claim 11, wherein a number of the blocks included in the ground-contact surface region in the tilted attitude is not less than 3 and less than 12.

13. The motorcycle tire according to claim 1, wherein
in at least a part of the plurality of blocks, a step is provided at at least a part of a corner portion located on a rotation direction toe side or heel side thereof, and
when a height, to the step, of the block in which the step is provided is denoted by h1, and a height from the step to the land surface of the block is denoted by h2, the height h1 is greater than the height h2.

14. The motorcycle tire according to claim 13, wherein a product of the complex elastic modulus and a ratio of the height h1 to the height h2 is not less than 10.2 MPa and not greater than 14.1 MPa.

15. The motorcycle tire according to claim 13, wherein a ratio of the height h1 to the height h2 is not less than 1.02 and not greater than 1.08.

16. The motorcycle tire according to claim 13, wherein the step is provided in the center block.

17. The motorcycle tire according to claim 1, wherein a rubber composition for each block contains a base rubber and a carbon black,
the carbon black has a cetyltrimethylammonium bromide specific surface area of not less than 160 $m^2/g$, and
the carbon black has a compressed oil absorption number of not greater than 110 $cm^3/100$ g.

18. The motorcycle tire according to claim 17, wherein an amount of the carbon black contained in the rubber composition, per 100 parts by mass of the base rubber, is not less than 2 parts by mass and not greater than 200 parts by mass.

19. The motorcycle tire according to claim 17, wherein the base rubber has a weight-average molecular weight of not less than 400 thousand and not greater than 1.5 million, and
the base rubber has a glass transition temperature of not lower than −30° C. and not higher than −5° C.

20. The motorcycle tire according to claim 17, wherein the base rubber contains styrene-butadiene rubber, and
an amount of the styrene-butadiene rubber contained in the entire base rubber is not less than 60% by mass.

* * * * *